United States Patent
James et al.

(10) Patent No.: US 10,836,366 B2
(45) Date of Patent: Nov. 17, 2020

(54) METHODS AND APPARATUS FOR AUTOMATIC CALIBRATION OF ELECTRONIC TRAILER BRAKE GAIN

(71) Applicant: Ford Global Technologies, LLC, Dearborn, MI (US)

(72) Inventors: Alex James, Ypsilanti, MI (US); Thomas Salmon, Rochester, MI (US); Donald A. Perlick, Farmington Hills, MI (US); Bang Kim Cao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/994,629

(22) Filed: May 31, 2018

(65) Prior Publication Data
US 2019/0366989 A1 Dec. 5, 2019

(51) Int. Cl.
| | |
|---|---|
| *B60T 7/20* | (2006.01) |
| *B60T 8/17* | (2006.01) |
| *B60T 8/1761* | (2006.01) |
| *B60T 8/32* | (2006.01) |
| *B60R 16/023* | (2006.01) |

(52) U.S. Cl.
CPC ............ *B60T 7/206* (2013.01); *B60T 8/1708* (2013.01); *B60T 8/17616* (2013.01); *B60T 8/323* (2013.01); *B60R 16/0231* (2013.01)

(58) Field of Classification Search
CPC .... B60T 7/206; B60T 8/1708; B60T 8/17616; B60T 8/323
See application file for complete search history.

(56) References Cited

U.S. PATENT DOCUMENTS

| | | | | |
|---|---|---|---|---|
| 5,409,301 | A | * | 4/1995 | Topfer ..................... B60T 7/20 303/22.1 |
| 5,782,542 | A | | 7/1998 | McGrath et al. |
| 6,042,196 | A | | 3/2000 | Nakamura et al. |
| 6,705,684 | B1 | | 3/2004 | Garvey |
| 7,021,723 | B1 | | 4/2006 | Kaufman |
| 7,204,564 | B2 | * | 4/2007 | Brown .................. B60K 35/00 303/7 |
| 7,438,368 | B2 | | 10/2008 | Kohler et al. |
| 8,068,019 | B2 | | 11/2011 | Bennie et al. |
| 8,511,759 | B2 | * | 8/2013 | Marsden ................ B60K 35/00 188/112 R |

(Continued)

FOREIGN PATENT DOCUMENTS

WO    9939952    8/1999

OTHER PUBLICATIONS

United States Patent and Trademark Office, "Notice of Allowance," dated Mar. 4, 2020 in connection with U.S. Appl. No. 15/878,008, 10 pages.

*Primary Examiner* — Xuan Lan Nguyen
(74) *Attorney, Agent, or Firm* — Ray Coppiellie; Hanley, Flight & Zimmerman, LLC

(57) ABSTRACT

Methods, apparatus, systems and articles of manufacture are disclosed for automatic calibration of electronic trailer brake gain. An example apparatus includes a trailer brake gain calibration module programmed to compare a calculated trailer brake torque to at least one of a first or second threshold, adjust a gain value based upon satisfaction of at least one of the first or second threshold, and apply a pressure to a trailer brake based on the gain value.

17 Claims, 8 Drawing Sheets

(56) References Cited

U.S. PATENT DOCUMENTS

| | | |
|---|---|---|
| 9,278,673 B2 | 3/2016 | Squire et al. |
| 9,290,185 B2 * | 3/2016 | Hall ..................... B60W 40/13 |
| 9,321,440 B2 | 4/2016 | Perlick et al. |
| 9,440,627 B2 | 9/2016 | Kurtovic et al. |
| 9,475,470 B2 | 10/2016 | Maitlen |
| 9,481,346 B2 | 11/2016 | Morselli et al. |
| 2005/0006946 A1 | 1/2005 | Traechtler et al. |
| 2008/0143179 A1* | 6/2008 | Rutherford ............... B60T 7/20 |
| | | 303/160 |
| 2008/0172163 A1 | 7/2008 | Englert et al. |
| 2015/0353063 A1 | 12/2015 | Tuhro et al. |
| 2018/0009421 A1 | 1/2018 | Albright et al. |
| 2018/0079395 A1 | 3/2018 | Cekola et al. |
| 2018/0215358 A1* | 8/2018 | Hall ..................... B60T 8/1887 |
| 2019/0225196 A1 | 7/2019 | Niedert et al. |

\* cited by examiner

US 10,836,366 B2

METHODS AND APPARATUS FOR AUTOMATIC CALIBRATION OF ELECTRONIC TRAILER BRAKE GAIN

FIELD OF THE DISCLOSURE

This disclosure relates generally to vehicles and, more particularly, to automatic calibration of electronic trailer brake gain.

BACKGROUND

In recent years, consumer vehicles capable of pulling trailers have implemented electronic braking systems. Such electronic braking systems allow for greater control of the magnitude of braking force applied by the trailer brakes through a trailer brake gain that is controlled by a user of the vehicle. It is desirable for this gain to be adjusted to an optimal level because a gain that is too high (i.e., the magnitude of braking force applied by the trailer brakes is too high) can affect control of the trailer, and a gain that is too low (i.e., the magnitude of braking force applied by the trailer brakes is too low) will require extra braking force from the brakes of the vehicle, causing unnecessary wear on the vehicle brakes.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
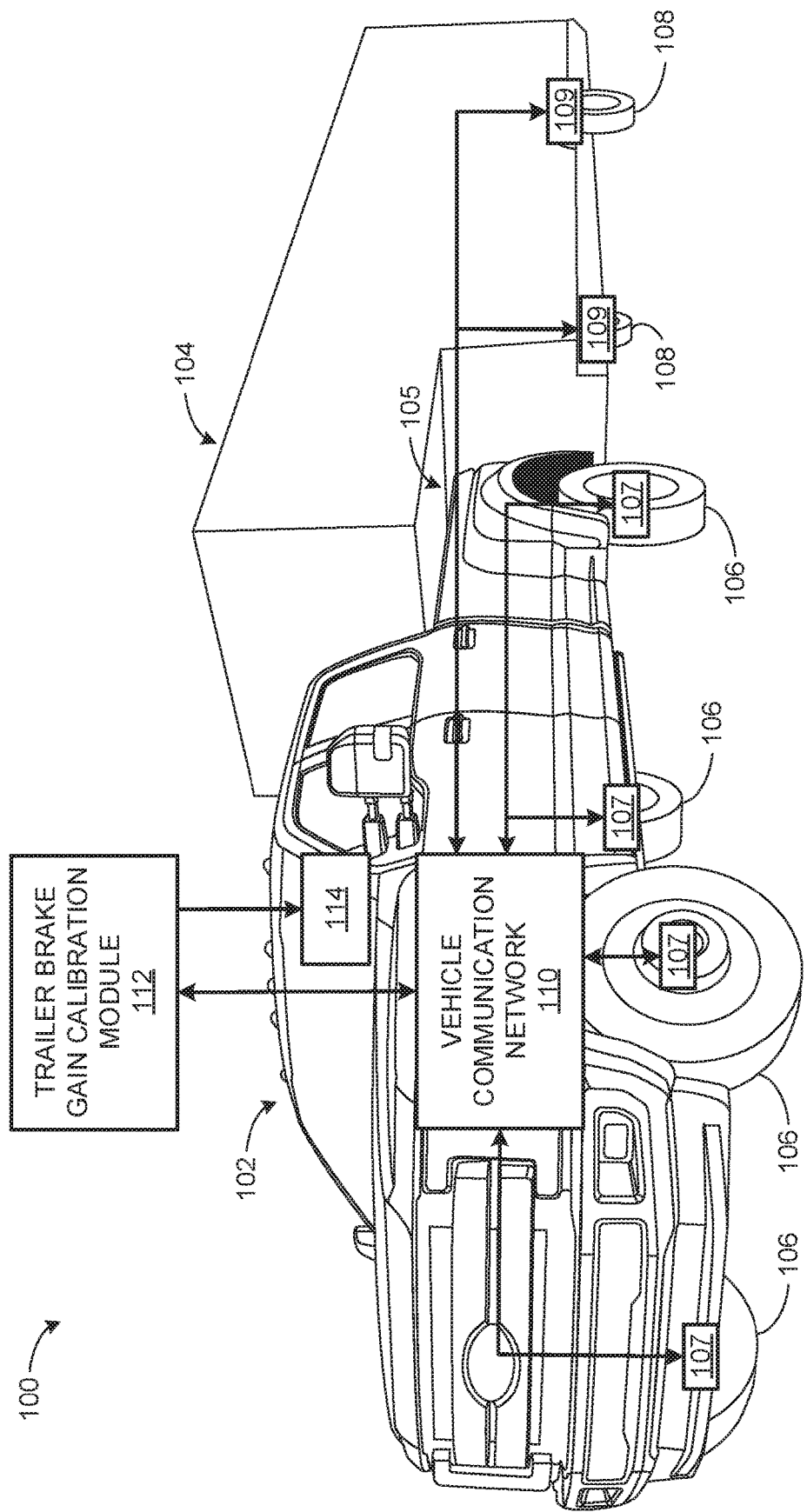
FIG. 1 illustrates an example vehicle and an example trailer coupled to the vehicle including a vehicle communication network and a trailer brake gain calibration module by which the examples disclosed herein can be implemented.

Many modern vehicles and trailers implement electronic braking systems. Such electronic braking systems allow for greater control of the magnitude of braking force applied by the trailer brakes through a trailer brake gain that is controlled by a user of the vehicle. It is desirable for this gain to be adjusted to an optimal level because too much trailer braking force can affect control of the trailer, and too little trailer braking force will require extra braking force from the brakes of the vehicle, causing unnecessary wear on the vehicle brakes.

In vehicle based electronic braking systems, gain can refer to a coefficient (e.g., a value) that modifies a brake output curve, the brake output curve taken with respect to a level of braking requested by a user of the vehicle (e.g., an amount a brake pedal of the vehicle is deflected). As used herein, gain refers to the coefficient or value (e.g., 3, 7, 2, 8.5, etc.) used to select the brake output curve. In many examples, a range of selectable gains can range from 1 to 9, incrementing by 1 (e.g., 1, 2, 3, etc.) or by 0.5 (e.g., 1, 1.5, 2, etc.). However, any range and increment of gain can be utilized using the examples disclosed herein.

Conventional electronic trailer braking systems require a user of the vehicle to manually calibrate (i.e., adjust) the trailer brake gain to the optimal level. Adjusting the trailer brake gain to the optimal level generally includes manually determining the trailer brake gain value at which the trailer brakes lock up (i.e., wheels of the trailer begin sliding on the driving surface) and decreasing the trailer brake gain from this value.

This procedure requires a significant amount of time investment by the user of the vehicle. The procedure also requires a large, empty space to complete the calibration and for the trailer brakes to be locked up, applying unnecessary wear to the trailer brakes and trailer tires. In addition, using this procedure, the trailer brake gain would likely have to be recalibrated when the load in the trailer and/or driving conditions (i.e., temperature, precipitation, driving surface condition, etc.) change. This is an onerous task for the user of the vehicle because the calibration is completed manually. As such, methods and apparatus to automatically adjust trailer brake gain are needed.

Examples disclosed herein automatically calibrate (i.e., adjust) trailer brake gain to a substantially optimal value. More specifically, the examples detect whether the trailer brake gain needs to be calibrated and, in response to determining the trailer brake gain does need to be calibrated, modulate the trailer brake gain based upon a trailer brake torque satisfying one or more thresholds calculated based upon an estimated minimum and maximum weight of the trailer.

As will be set forth in greater detail below, the examples disclosed herein provide a trailer brake gain calibration module to automatically calibrate the trailer brake gain to a substantially optimal value. In some examples, the trailer brake gain calibration module determines whether trailer brake gain calibration is necessary based on a change in conditions of and/or about the vehicle. For example, the trailer brake gain calibration module may determine it is necessary to calibrate the trailer brake gain each time the vehicle is started (e.g., each time an ignition cycle of the vehicle is detected).

In response to determining that trailer brake gain calibration is needed, the trailer brake gain calibration module is further to initialize the trailer brake calibration process. The trailer brake calibration process, in some examples, includes applying a brake pressure (via a voltage generated by the module) to the electronic brakes of the trailer coupled to the vehicle based on an initial trailer brake gain. The trailer brake gain calibration module is further to determine the trailer brake torque corresponding to the initial trailer brake gain. Additionally, the determined trailer brake torque is compared to a lower limit (e.g., lower threshold) and upper limit (e.g., upper threshold). Based on satisfaction of one of the thresholds, the trailer brake gain calibration module modulates (e.g., increases or decreases) the trailer brake gain and this process is repeated until each of the thresholds is satisfied.

As will be discussed in greater detail below in accordance with the teachings of this disclosure, the trailer brake gain calibration module can have various configurations that may depend on a type of vehicle and/or trailer coupled to the vehicle. In examples disclosed herein, these configurations can be changed or altered to ensure the trailer brake gain calibration module properly diagnoses the need for a trailer brake gain calibration and to calibrate the trailer gain value to a proper level.

Turning to FIG. 1, an example environment of use 100 includes a vehicle 102 capable of towing a trailer 104. In the illustrated example, the trailer 104 is coupled to the vehicle 102 by an example trailer hitch 105. The trailer 104 and the contents thereof can be any weight towable by the vehicle 102. For example, if the towing capacity of the vehicle 102 is 10,000 lbs., the trailer 104 and the contents thereof can be any weight less than or equal to 10,000 lbs. (e.g., 9,000 lbs., 3,000 lbs., etc.). Additionally, the weight of the trailer 104 and the contents thereof can vary with time. For example, if the vehicle 102 is used to deliver goods, the weight of the trailer 104 and the contents thereof may decrease after a delivery is complete.

The vehicle 102 further includes one or more wheels 106. In the illustrated example of FIG. 1, the vehicle 102 has four wheels 106. Additionally, one or more of the wheels 106 may include a brake system 107. In the illustrated example of FIG. 1, each of the wheels 106 includes the brake system 107. In some examples, the brake systems 107 may include drum and/or disc brakes. Additionally or alternatively, the brake systems 107 may include any additional and/or different mechanisms capable of reducing the speed of the vehicle 102.

Similar to the vehicle 102, the trailer 104 includes one or more wheels 108. In the illustrated example of FIG. 1, the trailer 104 includes two wheels 108. Additionally, one or more of the wheels 108 may include a brake system 109. In the illustrated example of FIG. 1, each of the wheels 108 includes the brake system 109. The brake systems 109 may include drum and/or disc brakes.

In some examples, a braking force applied by the braking systems 109 may be electronically controlled. In such examples, the braking force applied may be modulated automatically by a processor and/or by a user of the vehicle 102. Additionally or alternatively, a braking force applied by the braking systems 109 may be pneumatically and/or hydraulically controlled. In such examples, the braking force applied is directly modulated by a loading applied to the vehicle 102 by the trailer 104.

The vehicle 102 further includes a vehicle communication network 110 and a trailer brake gain calibration module 112 to enable automatic calibration of the trailer brake gain. The vehicle communication network 110 and the trailer brake gain calibration module 112 are described in further detail in conjunction with FIG. 2, The vehicle 102 further includes an example display 114. In some examples, the display 114 is capable of alerting a user of the vehicle 102 to parameters and/or data from at least one of the vehicle communication network 110 or the trailer brake gain calibration module 112. The display 114 may be any device capable of providing a notification to the user of the vehicle 102. For example, the display 114 may be a visual display capable of visually displaying parameters and/or data. Additionally in such examples, the visual display of the display 114 may be a touch display capable of receiving one or more inputs from a user or other occupant of the vehicle 102. Additionally or alternatively, the display 114 may be an audio system capable of audibly reciting parameters and/or data. In some examples, the parameters and/or data distributed by the display 114 may include at least one of a trailer brake gain calibration process complete notification, a calibrated trailer brake gain, a hitch force, etc.

Figure 2:
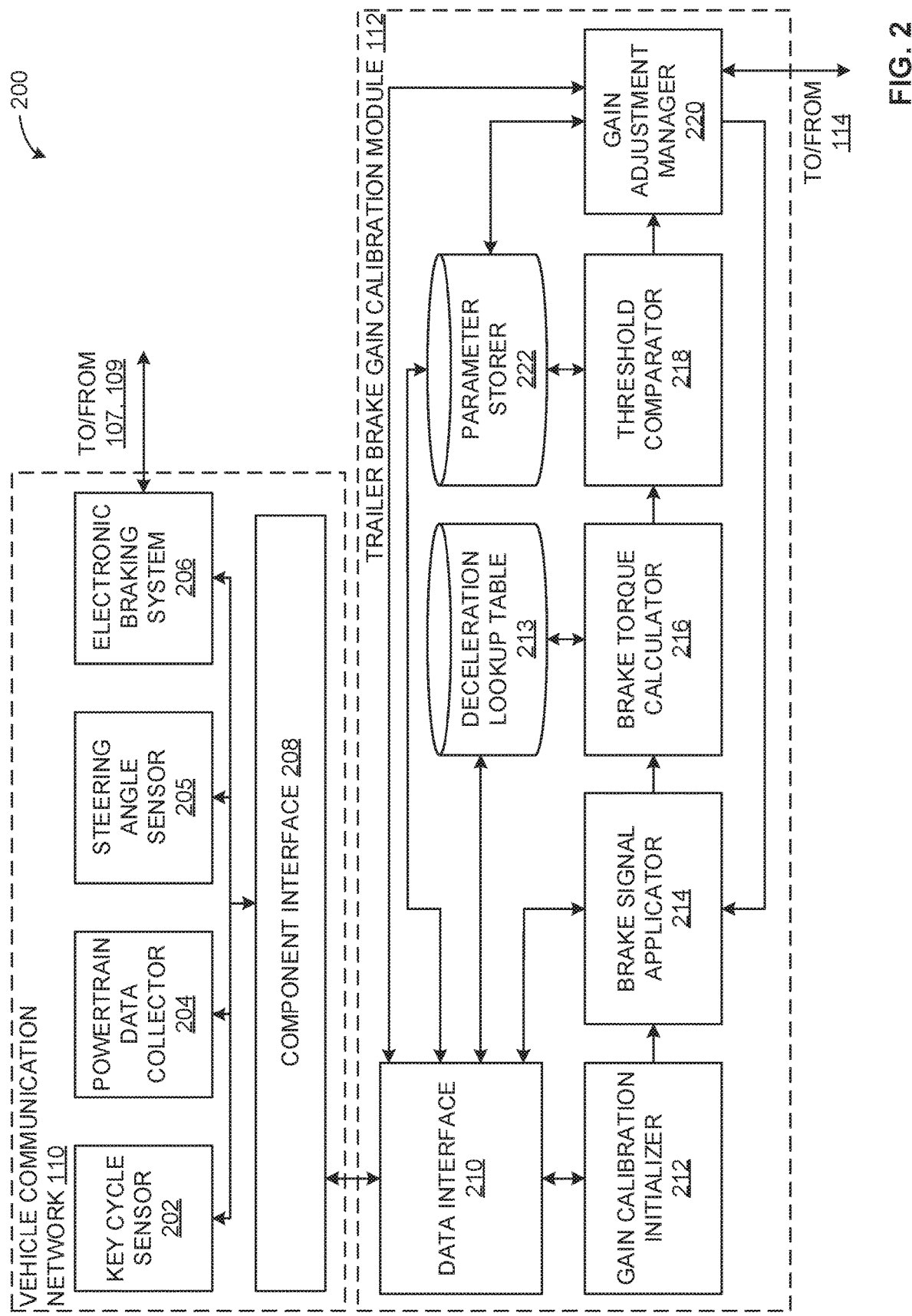
FIG. 2 is a block diagram further detailing the vehicle communication network and the trailer brake gain calibration module of FIG. 1 by which the examples disclosed herein can be implemented.

FIG. 2 is a block diagram of an example implementation 200 of the example vehicle communication network 110 and the example trailer brake gain calibration module 112 of FIG. 1. The vehicle communication network 110 can, in some examples such as the illustrated example of FIG. 2, include an example key cycle sensor 202, an example powertrain data collector 204, an example steering angle sensor 205, an example electronic braking system 206, and an example component interface 208.

Additionally, in some examples such as the illustrated example of FIG. 2, the trailer brake gain calibration module 112 can include an example data interface 210, an example gain calibration initializer 212, an example deceleration lookup table 213, an example brake signal applicator 214, an example brake torque calculator 216, an example threshold comparator 218, an example gain adjustment manager 220, and an example parameter storer 222, Returning to the vehicle communication network 110, the key cycle sensor 202, included in or otherwise implemented by the vehicle communication network 110, is capable of determining when the vehicle 102 is started (e.g., a key is used to start/cycle the vehicle 102) and distributing a notification to the component interface 208 when the vehicle 102 is started (e.g., an ignition cycle of the vehicle is detected). In some examples where a user of the vehicle 102 is identifiable by the key used to start the vehicle 102, the notification distributed to the component interface 208 can further include an identifier of the user.

The powertrain data collector 204, included in or otherwise implemented by the vehicle communication network 110, is capable of determining and distributing one or more kinetic and/or kinematic parameters of the vehicle 102. In some examples, the kinetic parameters can include at least one of a torque and/or power output of the vehicle 102. Additionally, the kinematic parameters can include at least one of the position, the velocity, and/or the acceleration of the vehicle 102. In some examples, a torque output of the vehicle 102 and corresponding acceleration of the vehicle 102 are utilized to approximate a train (e.g., combination of the vehicle 102 and the trailer 104) mass of the vehicle 102 and the trailer 104.

The steering angle sensor 205, included in or otherwise implemented by the vehicle communication network 110, is capable of determining a steering angle of the vehicle 102. In some examples, the steering angle of the vehicle 102 is based upon an angle of the steered wheels of the wheels 106 (for example, the front wheels of the vehicle 102). The angle is based upon an angular deviation from a straight line orientation of the steered wheels.

The example electronic braking system 206, included in or otherwise implemented by the vehicle communication network 110, is capable of distributing data related to the wheels 106 and corresponding braking systems 107 of the vehicle 102 and data related to the wheels 108 and corresponding braking system 109 of the trailer 104. In some examples, the data distributed can include the rotational speed of the wheels 106, 108 and/or a voltage and/or pressure applied by the braking systems 107, 109. Additionally or alternatively, the electronic braking system 206 can distribute a notification that the trailer 104 is coupled to the vehicle 102 when data for at least one of the wheels 108 and/or the braking systems 109 is received.

The component interface 208, included in or otherwise implemented by the vehicle communication network 110, is capable of receiving and/or distributing data from and/or to at least one of the key cycle sensor 202, the powertrain data collector 204, the steering angle sensor 205, and/or the electronic braking system 206. Additionally, the component interface 208 may determine a time at which data was received and append a timestamp to the data based upon the reception time. The component interface 208 is additionally capable of distributing data to the trailer brake gain calibration module 112 and/or receiving data from the trailer brake gain calibration module 112.

The data interface 210, included in or otherwise implemented by the trailer brake gain calibration module 112, is capable of receiving data from and/or distributing data to the component interface 208 included in the vehicle communication network 110. The data interface 210 is further capable of distributing received data to and/or receiving calculated values from at least one of the gain calibration initializer 212, the deceleration lookup table 213, the brake signal applicator 214, the brake torque calculator 216, the gain adjustment manager 220, and/or the parameter storer 222. For example, the data interface 210 may distribute data from the powertrain data collector 204 (e.g., speed of the vehicle 102, torque and/or power of the vehicle 102 etc.) to at least one of the gain calibration initializer 212 and/or the deceleration lookup table 213. In other examples, the data interface 210 may distribute data between (e.g., incoming and outgoing data) the electronic braking system 206 and the brake signal applicator 214.

The gain calibration initializer 212, included in or otherwise implemented by the trailer brake gain calibration module 112, is capable of determining whether it is desired to calibrate a trailer brake gain value. For example, the gain calibration initializer 212 can determine it is desired to calibrate the trailer brake only if the trailer 104 is coupled to the vehicle 102 as determined by the electronic braking system 206, the velocity of the vehicle is within a threshold (e.g., less than 20 miles per hour) as determined by the powertrain data collector 204, and the steering angle of the vehicle 102 is within a threshold (e.g., less than +/−5 degrees) as determined by the steering angle sensor 205. Conversely, the gain calibration initializer 212 can determine it is desired to abort the calibration of the trailer brake gain value when one of the steering angle threshold or velocity of the vehicle threshold is exceeded.

In some examples, the gain calibration initializer 212 may further determine it is desired to calibrate the trailer brake gain value based upon an input from a user of the vehicle 102. Additionally or alternatively, the gain calibration initializer 212 may determine it is desired to calibrate the trailer brake gain value based upon data (e.g., parameters) received from the vehicle communication network 110. In some examples, it is desired to calibrate the trailer brake gain value when there is a change in one of the parameters received from the vehicle communication network 110. For example, it may be desired to calibrate the trailer brake gain value when the key cycle sensor 202 distributes a notification that the vehicle 102 was started.

The gain calibration initializer 212, in response to determining it is desired to calibrate the trailer brake gain value, determines an initial value of trailer brake gain to distribute to the brake signal applicator 214. In some examples, the initial trailer brake gain value is based upon the determined mass of the trailer 104 (e.g., a trailer brake gain value of 2 for a light trailer, a trailer brake gain value of 4 for a medium trailer, and a trailer brake gain value of 6 for a heavy trailer when gain is measured on a range of 1 to 9). Additionally or alternatively, the gain calibration initializer 212 may determine an initial trailer brake gain value based upon a previously calibrated trailer brake gain value. Additionally or alternatively, the gain calibration initializer 212 may select a nominal value for the initial trailer brake gain value. For example, the gain calibration initializer 212 may select a midpoint of the full range of possible trailer brake gains (e.g., a gain value of 5 within a range of 1 to 9).

Further in response to determining it is desired to calibrate the trailer brake gain, the gain calibration initializer 212 of FIG. 2 calculates the maximum and minimum mass of the trailer 104 based upon the train mass (e.g., the mass of the vehicle 102 and the trailer 104 combined) and a maximum and minimum mass of the vehicle 102 (e.g., a gross vehicle weight (GVW) and curb weight, respectively) retrieved from the parameter storer 222.

The deceleration lookup table 213, included in or otherwise implemented by the trailer brake gain calibration module 112, is capable of storing a lookup table of acceleration/deceleration of the vehicle 102 associated with corresponding vehicle only brake torque. In some examples, values of acceleration/deceleration of the vehicle 102 are obtained from the powertrain data collector 204 via the data interface 210 and brake torque values are obtained from the brake torque calculator 216. In some examples, the deceleration lookup table 213 can be queried with a value of brake torque or a value of deceleration/acceleration for the vehicle 102 and can, based on the query, output a corresponding value of acceleration/deceleration or a value of brake torque, respectively.

The brake signal applicator 214, included in or otherwise implemented by the trailer brake gain calibration module 112, is capable of generating a signal (e.g., a voltage, a current, a pressure, etc.) which corresponds to a braking pressure to be applied to at least one of the braking systems 107 included in the vehicle 102 and the braking systems 109 included in the trailer 104 based upon a received gain. In some examples, the brake signal applicator 214 may receive an initial trailer brake gain from the gain calibration initializer 212. Additionally or alternatively, the brake signal applicator 214 may receive a trailer brake gain from the gain adjustment manager 220. In some examples, the trailer brake gain received from the gain adjustment manager 220 may be a calibrated trailer brake gain.

In some examples, the brake signal applicator 214 may determine a signal to generate (e.g., a current signal, a voltage signal, a pressure signal, etc.) based upon the received trailer brake gain. Additionally or alternatively, the brake signal applicator 214 may utilize equations and/or parameters in addition to the received trailer brake gain to determine the signal to generate. Further, upon application of the braking pressure, the brake signal applicator 214 is to notify the brake torque calculator 216 that the braking pressure based upon the commanded trailer brake gain has been applied to at least one of the braking systems 107 and/or the braking systems 109.

The brake torque calculator 216, included in or otherwise implemented by the trailer brake gain calibration module 112, is capable of calculating a braking torque for at least one of the braking systems 107 and/or the braking systems 109. In some examples, when the trailer brake gain is equal to 0, the brake torque calculator 216 can calculate the torque of the braking systems 107 of the vehicle 102, as the braking systems 109 of the trailer 104 are not active when the trailer brake gain value is equal to 0. In some examples, the torque of the braking systems can be determined based on the mass of the vehicle received from the vehicle communication network 110 and a deceleration of the vehicle 102 received from the powertrain data collector 204. In response to the calculation of the brake torque, the brake torque and the corresponding deceleration of the vehicle 102 can be stored in the deceleration lookup table 213.

In other examples, when the trailer brake gain value is not equal to 0, the torque of the braking systems 107 can be calculated based upon historical values of torque at the present deceleration of the vehicle 102 and the torque of the braking systems 109 can be calculated based on the difference between the total brake torque on the system and the torque of the braking system 107. In response to calculation of the torque of the braking systems 109 (e.g., the trailer brake torque), the value is distributed to the threshold comparator 218.

The threshold comparator 218, included in or otherwise implemented by the trailer brake gain calibration module 112, is capable of comparing the trailer brake torque calculated by the brake torque calculator 216 to at least one of the lower limit trailer brake torque and the upper limit trailer brake torque calculated by the gain calibration initializer 212 or obtained from the parameter storer 222. In some examples, the comparisons yield one or more threshold satisfaction statuses. For example, the trailer brake torque may be greater than the lower limit and less than the upper limit, satisfying each of the lower limit (e.g., threshold) and upper limit (e.g., threshold) in the process. In other examples, the trailer brake torque may be less than both the lower limit and the upper limit, satisfying only the upper limit. In yet other examples, the trailer brake torque may be greater than both the lower limit and the upper limit, satisfying only the lower limit. In response to determining the one or more satisfaction statuses, the threshold comparator 218 distributes the one or more statuses to the gain adjustment manager 220 for further processing.

The gain adjustment manager 220, included in or otherwise implemented by the trailer brake gain calibration module 112, is capable of utilizing limit satisfaction determinations (e.g., comparisons of the trailer brake torque to the lower limit and upper limit of trailer brake torque) made by the threshold comparator 218 to adjust (e.g., modulate) the trailer brake gain. For example, in response to the trailer brake torque not satisfying the lower limit (e.g., the trailer brake torque is less than the lower limit), the gain adjustment manager 220 increases the trailer brake gain value. In some examples, the trailer brake gain value is increased based upon a deviation between the trailer brake torque and the trailer brake torque lower limit. Additionally or alternatively, the trailer brake gain value is increased by a static value. In response to determining the decreased trailer brake gain value, the gain adjustment manager 220 propagates the value to the brake signal applicator 214.

In other examples, in response to the trailer brake torque not satisfying the upper limit (e.g., the trailer brake torque is greater than the upper limit), the gain adjustment manager 220 decreases the trailer brake gain value. In some examples, the trailer brake gain value is decreased based upon the deviation between the trailer brake torque and the trailer brake torque upper limit. Additionally or alternatively, the trailer brake gain value is decreased by a static value. Additionally or alternatively, in response to a previous value of trailer brake gain resulting in a trailer brake torque less than the lower limit, the trailer brake gain value is decreased to a value greater than the trailer brake gain resulting in the lesser torque and less than the current trailer brake gain. In response to determining the increased trailer brake gain value, the gain adjustment manager 220 propagates the value to the brake signal applicator 214.

In yet other examples, the trailer brake torque satisfies each of the lower limit and the upper limit (e.g., the trailer brake torque is greater than the lower limit and less than the upper limit). In such examples, the gain adjustment manager 220 distributes the current trailer brake gain value to the brake signal applicator 214, the parameter storer 222, and the display 114 as the suggested trailer brake gain value.

In yet other examples, the gain adjustment manager 220 may determine that multiple values of trailer brake torque satisfy each of the lower limit and the upper limit. In such examples, the gain adjustment manager 220 can distribute the maximum and minimum trailer brake gains for which the trailer brake torque satisfies each of the lower and upper limits as recommended trailer brake gain limits to each of the display 114 for display to a user of the vehicle 102 and the parameter storer 222.

In yet other examples, the gain adjustment manager 220 may determine that the lower limit is not satisfied for each trailer brake gain value utilized (e.g., the trailer brake torque is not greater that the lower threshold for the trailer brake gain values). In such examples, one of the braking systems 107 and/or braking systems 109 may need service (e.g., repair) and the gain adjustment manager 220, in such examples, notifies the user of the vehicle 102 of the needed repair via the display 114.

Figure 4:
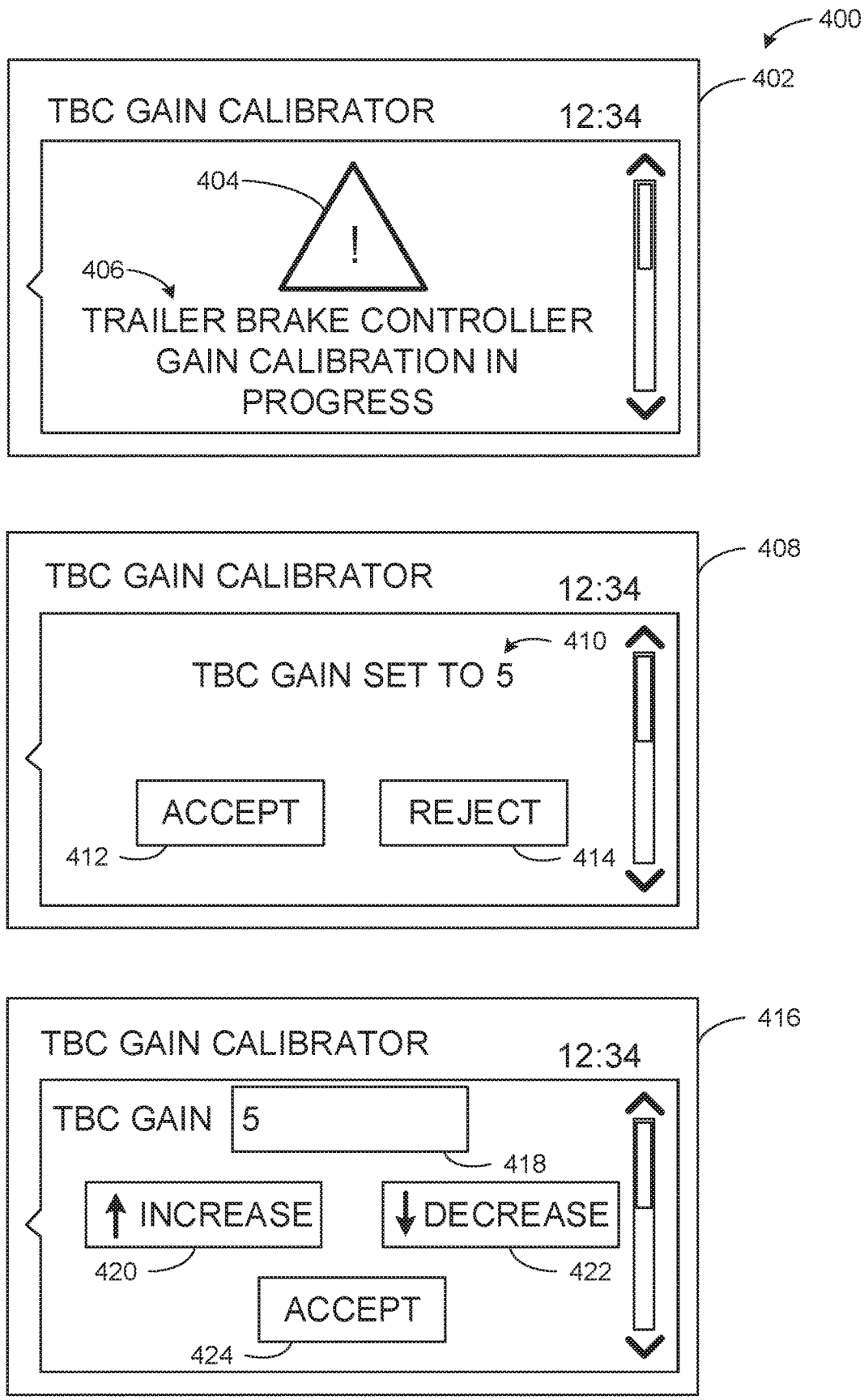
FIG. 4 illustrates example interfaces by which a user can accept, reject, and/or edit suggested trailer brake gain values as calculated by the trailer brake gain calibration module of FIGS. 1 and 2.

Additionally, as illustrated in accordance with FIG. 4, the gain adjustment manager 220 can obtain a user input from the display 114 to reject or accept the suggested trailer brake gain value. In some examples, in response to obtaining a user input to reject the suggested trailer brake gain value, the gain adjustment manager 220 solicits trailer brake gain modifications from the user of the vehicle 102 via the display 114. For example, based on the solicitation, the gain adjustment manager 220 may obtain an input from the user via the display 114 to increase or decrease the suggested trailer brake gain by a value. In response to obtaining this output, the gain adjustment manager 220 propagates the modified trailer brake gain to at least one of the brake signal applicator 214 and the parameter storer 222. In some examples, the gain adjustment manager 220 additionally stores the modification to the trailer brake gain as a user preference, the user preference to modify future calibrations of trailer brake gain.

The parameter storer 222, included in or otherwise implemented by the trailer brake gain calibration module 112, is capable of storing characteristics for at least one of the vehicle 102 and/or the trailer 104 (e.g., a make and/or model of the vehicle 102 and the trailer 104, a gross vehicle weight (GVW) and/or curb weight of the vehicle 102 and the trailer 104, etc.), thresholds (e.g., limits) for minimum trailer brake torque and/or maximum trailer brake torque, and suggested and/or modifications to trailer brake gain, among others.

The deceleration lookup table 213 and the parameter storer 222 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The deceleration lookup table 213 and the parameter storer 222 may additionally or alternatively be implemented by one or more double data rate (DDR) memories, such as DDR, DDR2, DDR3, mobile DDR (mDDR), etc. The deceleration lookup table 213 and the parameter storer 222 may additionally or alternatively be implemented by one or more mass storage devices such as hard disk drive(s), compact disk drive(s), digital versatile disk drive(s), etc. While in the illustrated example the deceleration lookup table 213 and the parameter storer 222 are illustrated as single databases, the deceleration lookup table 213 and the parameter storer 222 may be implemented by any number and/or type(s) of databases. Further, the deceleration lookup table 213 and the parameter storer 222 may be located in the vehicle 102 or at a central location outside of the vehicle 102. Furthermore, the data stored in the deceleration lookup table 213 and the parameter storer 222 may be in any data format such as, for example, binary data, comma delimited data, tab delimited data, structured query language (SQL) structures, etc.

While an example manner of implementing the trailer brake gain calibration module 112 of FIG. 1 is illustrated in FIG. 2, one or more of the elements, processes and/or devices illustrated in FIG. 2 may be combined, divided, re-arranged, omitted, eliminated and/or implemented in any other way. Further, the example data interface 210, the example gain calibration initializer 212, the example brake signal applicator 214, the example brake torque calculator 216, the example threshold comparator 218, the example gain adjustment manager 220 and/or, more generally, the example trailer brake gain calibration module 112 of FIG. 2 may be implemented by hardware, software, firmware and/or any combination of hardware, software and/or firmware. Thus, for example, any of the example data interface 210, the example gain calibration initializer 212, the example brake signal applicator 214, the example brake torque calculator 216, the example threshold comparator 218, the example gain adjustment manager 220 and/or, more generally, the example trailer brake gain calibration module 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 210, the example gain calibration initializer 212, the example brake signal applicator 214, the example brake torque calculator 216, the example threshold comparator 218, and/or the example gain adjustment manager 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example trailer brake gain calibration module 112 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
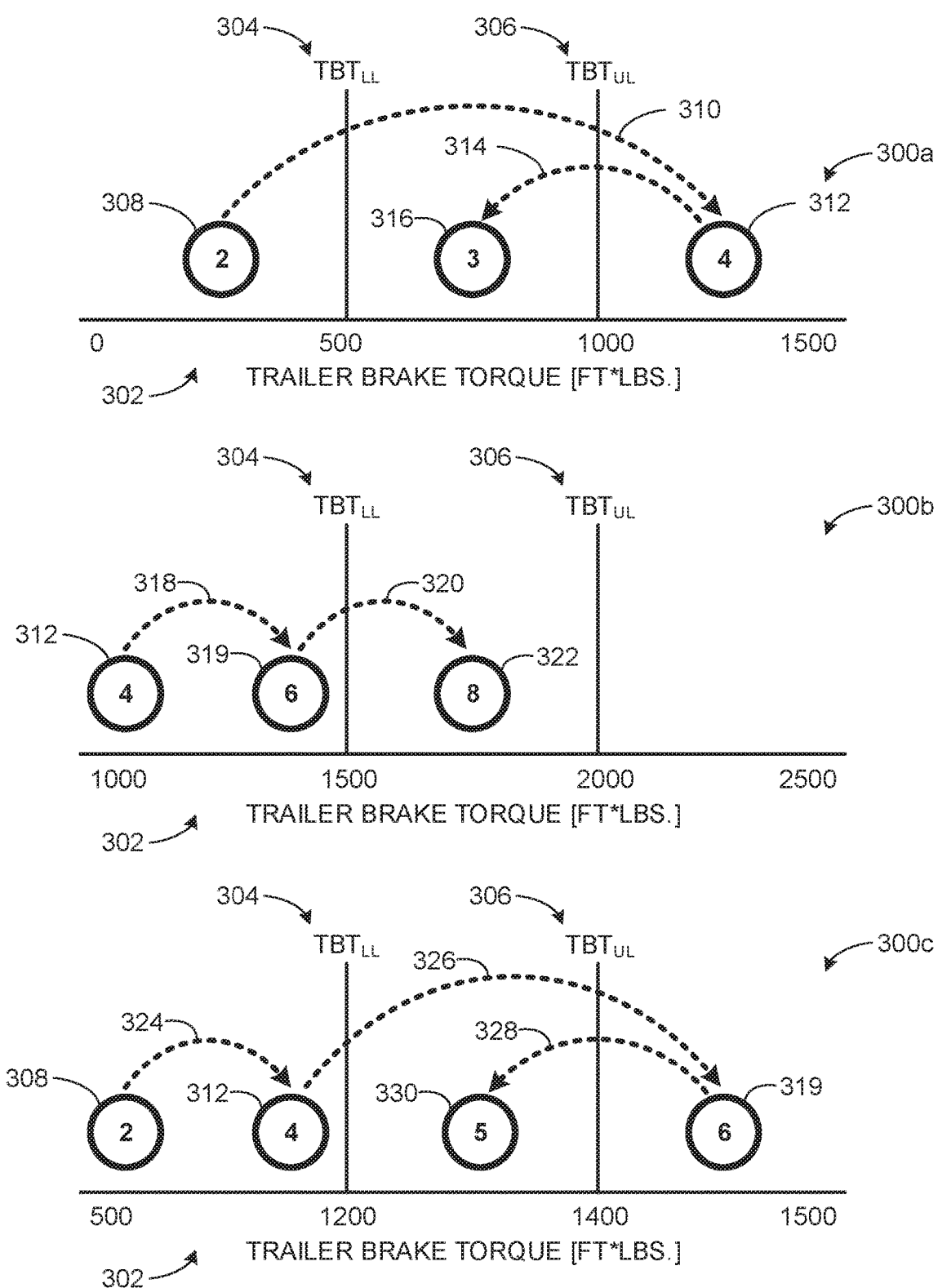
FIG. 3 illustrates example plotted progressions of trailer brake gain and corresponding torque as applied by the trailer brake gain calibration module of FIGS. 1 and 2.

FIG. 3 shows plots 300a, 300b, 300c of example progressions of trailer brake gain values during example calibration processes as completed by the example trailer brake gain calibration module 112 of FIGS. 1 and 2. Each of the plots 300a, 300b, 300c includes a horizontal axis 302 corresponding to trailer brake torque. In the illustrated example of FIG. 3, the horizontal axis 302 corresponds to a trailer brake torque range of 135 foot pounds, ranging from 0 foot pounds to 135 foot pounds. Each of the plots 300a, 300b, 300c additionally displays a trailer brake torque lower limit (TBT$_{LL}$) 304 and a trailer brake torque upper limit (TBT$_{UL}$) 306, where each of the TBT$_{LL}$ 304 and the TBT$_{UL}$ 306 are calculated by the example gain calibration initializer 212 of FIG. 2.

Turning to the plot 300a displaying a first example progression of trailer brake gain values during a first example calibration process, the example progression begins at a first gain value 308 equal to 2 (e.g., due to the gain calibration initializer 212 determining the trailer 104 is a light trailer) and resulting in a trailer brake torque less than the TBT$_{LL}$ 304. In response to the trailer brake torque at the first gain value 308 being less than TBT$_{LL}$ 304, the trailer brake gain calibration module 112 performs a first gain modification 310 that increases the gain by 2 to a second gain value 312 equal to 4. While in the illustrated example the first gain modification 310 increases the gain by 2, any other value may be used. In the illustrated example, the second gain value 312 results in a trailer brake torque greater than the TBT$_{UL}$ 306. As the first gain value 308 (e.g., 2) was determined to result in a trailer brake torque less than the TBT$_{LL}$ 304 and the second gain value 312 (e.g., 4) was determined to result in a trailer brake torque greater TBT$_{LL}$ 306, the trailer brake gain calibration module 112 determines a second gain modification 314 that decreases the gain by 1 to a third gain value 316, equal to 3. In the illustrated example, a trailer brake torque value for the third gain value 316 is determined to be greater than the TBT$_{LL}$ 304 and less than the TBT$_{LL}$ 306 and the first example calibration process is complete.

Turning to the plot 300b displaying a second example progression of trailer brake gain values during a second example calibration process, the example progression begins at the second gain value 312 equal to 4 (e.g., due to the gain calibration initializer 212 determining the trailer 104 is a medium trailer) and resulting in a trailer brake torque less than the TBT$_{LL}$ 304. In response to the trailer brake torque at the second gain value 312 being less than TBT$_{LL}$ 304, the trailer brake gain calibration module 112 performs a third gain modification 318 that increases the gain by 2 to a fourth gain value 319 equal to 6. While in the illustrated example the third gain modification 318 increases the gain by 2, any other value may be used. In the illustrated example, the fourth gain value 319 again results in a trailer brake torque less than the TBT$_{LL}$ 304 and the trailer brake gain calibration module 112 performs a fourth gain modification 320 which again increases the gain by 2 to a fifth gain value 322 equal to 8.

In the illustrated example, a trailer brake torque value for the fifth gain value 322 is determined to be greater than the TBT$_{LL}$ 304 and less than the TBT$_{UL}$ 306 and the second example calibration process is complete.

Turning to the plot 300c displaying a third example progression of trailer brake gain values during a third example calibration process, the example progression begins at the first gain value 308 equal to 2 (e.g., due to the gain calibration initializer 212 determining the trailer 104 is a light trailer) and resulting in a trailer brake torque less than the TBT$_{LL}$ 304. In response to the trailer brake torque at the second gain value 312 being less than TBT$_{LL}$ 304, the trailer brake gain calibration module 112 performs a fifth gain modification 324 that increases the gain by 2 to the second gain value 312 equal to 4. While in the illustrated example the fifth gain modification 324 increases the gain by 2, any other value may be used. In the illustrated example, the second gain value 312 again results in a trailer brake torque less than the $TBT_{LL}$ 304 and the trailer brake gain calibration module 112 performs a sixth gain modification 326 which again increases the gain by 2 to the fourth gain value 319 equal to 6.

In the illustrated example, the fourth gain value 319 results in a trailer brake torque greater than the $TBT_{UL}$ 306. As the second gain value 312 (e.g., 4) was determined to be the largest gain value resulting in a trailer brake torque less than the $TBT_{LL}$ 304 and the fourth gain value 319 (e.g., 6) was determined to result in a trailer brake torque greater $TBT_{UL}$ 306, the trailer brake gain calibration module 112 determines a seventh gain modification 328 that decreases the gain by 1 to a sixth gain value 330, equal to 5. In the illustrated example, a trailer brake torque value for the sixth gain value 330 is determined to be greater than the $TBT_{LL}$ 304 and less than the $TBT_{LL}$ 306 and the third example calibration process is complete.

FIG. 4 illustrates an example interface 400 that can be displayed by the display 114 included in the vehicle 102 of FIG. 1. For example, a first screen 402 of the interface 400 displays a warning 404 and a status alert 406 for a user (e.g., a driver) of the vehicle 102 via the display 114 in response to the example trailer brake gain calibration module 112 performing the gain calibration process. In the illustrated example, the status alert 406 states "Trailer brake controller gain calibration in progress." Additionally, in some examples, at least one of the warning 404 or the status alert 406 can further notify the driver of the vehicle 102 to proceed with caution while the calibration process is in progress.

In response to completion of the gain calibration process, a second screen 408 of the interface 400 is displayed, the second screen 408 displaying a gain selected by the calibration process via a text field 410. In the illustrated example, the text field 410 indicates that the gain selected by the calibration process is 5. Additionally, the second screen 408 includes a first input 412 (e.g., a touch screen input) to accept the gain displayed by the text field 410 and a second input 414 to reject the gain displayed by the text field 410. In response to the user of the vehicle 102 selecting the first input 412, the example trailer brake gain calibration module 112 sets the gain displayed as the trailer brake controller gain to command the example brake systems 109 of FIG. 1. In response to the user selecting the second input 414, a third screen 416 of the interface is displayed.

The third screen 416, displayed in response to the user of the vehicle 102 rejecting the calibrated gain by way of the second input 414, includes a gain field 418 displaying the current gain. Additionally, the third screen 416 further includes a third input 420 to manually increase the gain (e.g., increase the gain by 0.5 for each selection of the third input 420, increase the gain by 1.0 for each selection of the third input 420, etc.) and a fourth input 422 to manually decrease the gain (e.g., decrease the gain by 0.5 for each selection of the fourth input 422, decrease the gain by 1.0 for each selection of the fourth input 422, etc.).

In response to selection of at least one of the third input 420 or the fourth input 422, the gain field 418 changes accordingly. As such, in an example where the gain is modified by 1.0 per user input, the gain field 418 of the illustrated example of FIG. 4 displays 6 in response to selection of the third input 420 and displays 4 in response to selection of the fourth input 422. In response to the gain displayed in the gain field 418 equaling a user desired value, the user of the vehicle 102 can select a fifth input 424 to accept the value and the example trailer brake gain calibration module 112 sets the gain displayed by the gain field 418 as the trailer brake controller gain to command the example brake systems 109 of FIG. 1.

Figure 5:
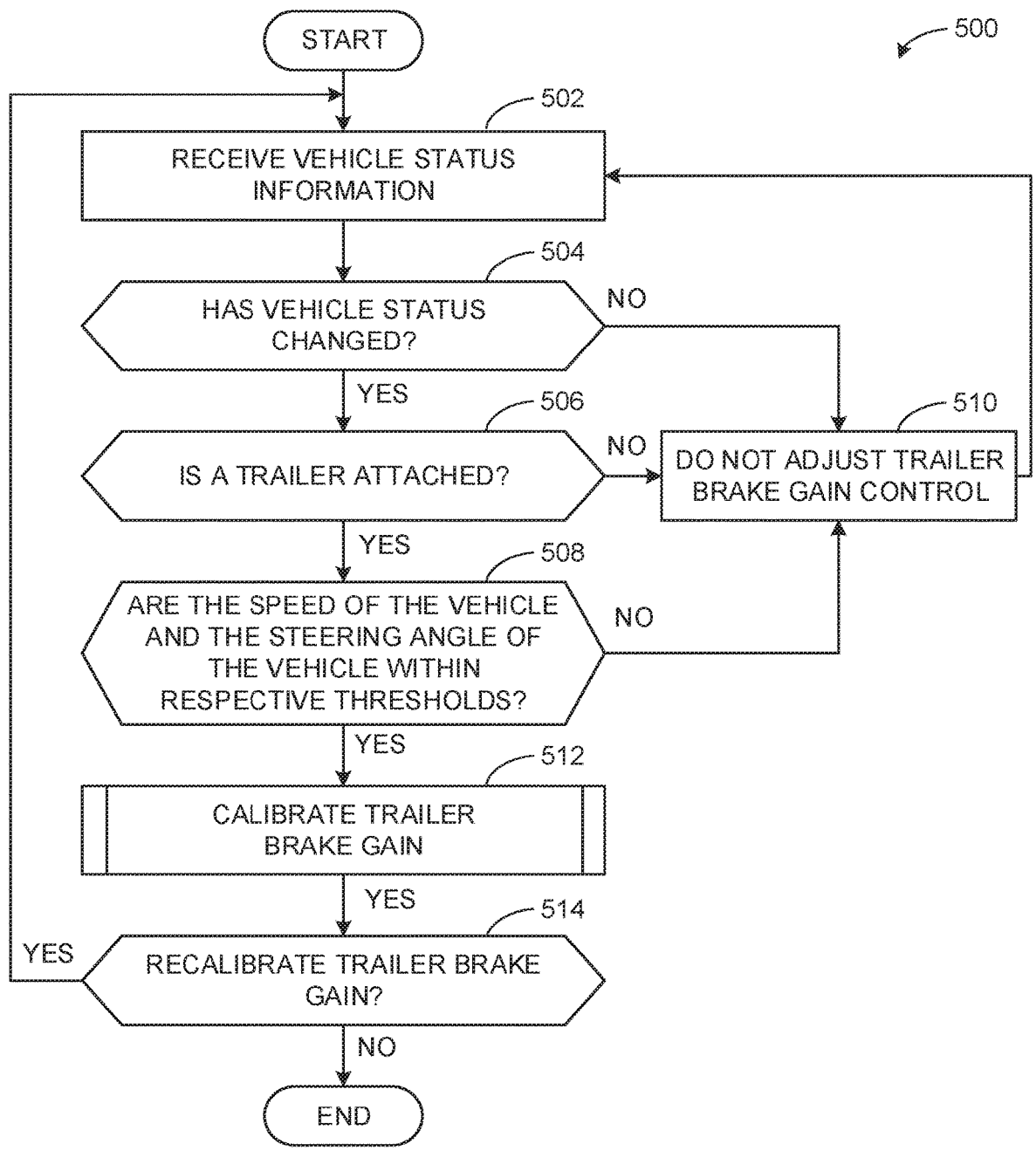
FIGS. 5, 6A, and 6B are flowcharts representative of example methods that may be performed using the trailer brake gain calibration module of FIGS. 1 and 2 to calibrate a trailer brake gain based on calculated trailer brake torque.
Figure 6A:
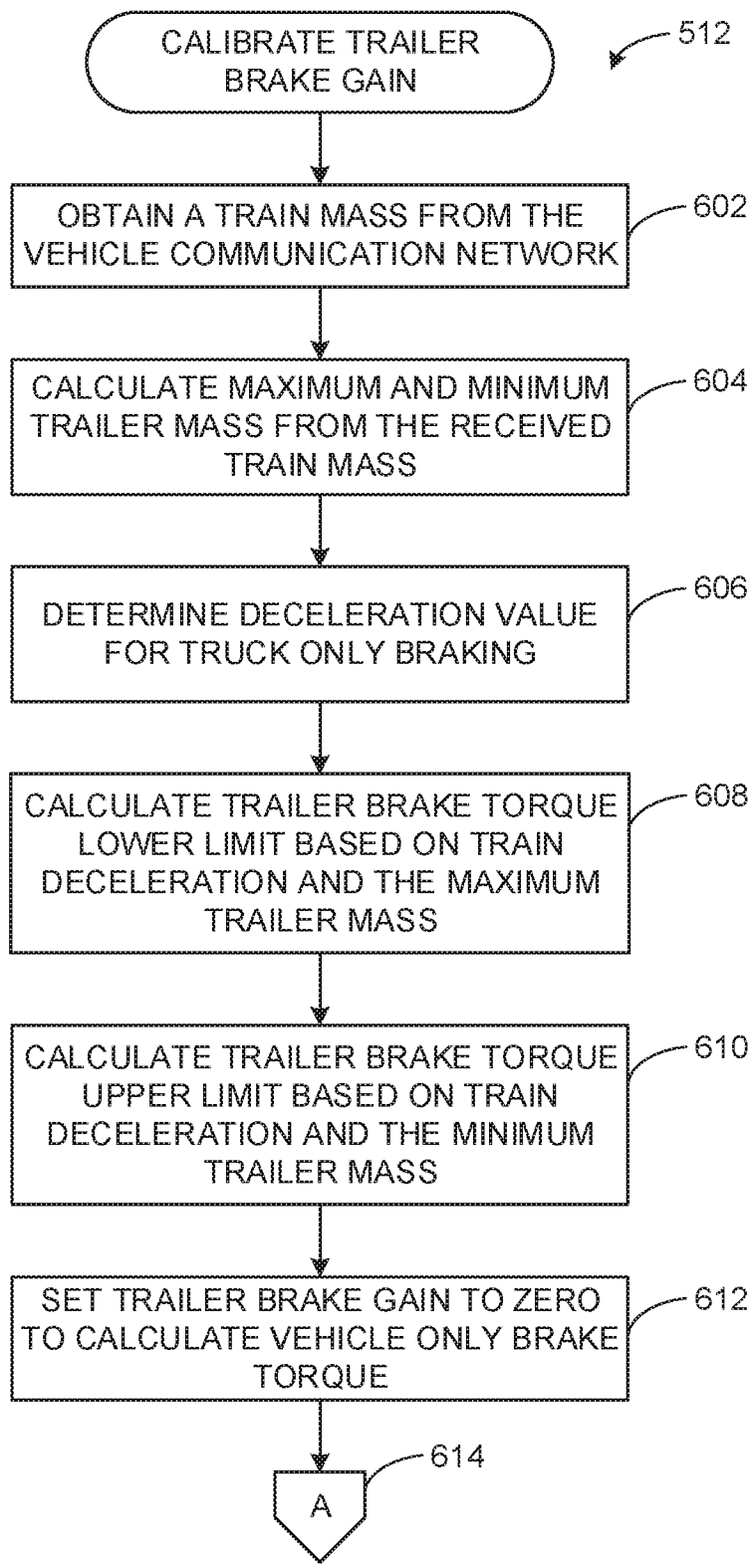
Figure 6B:
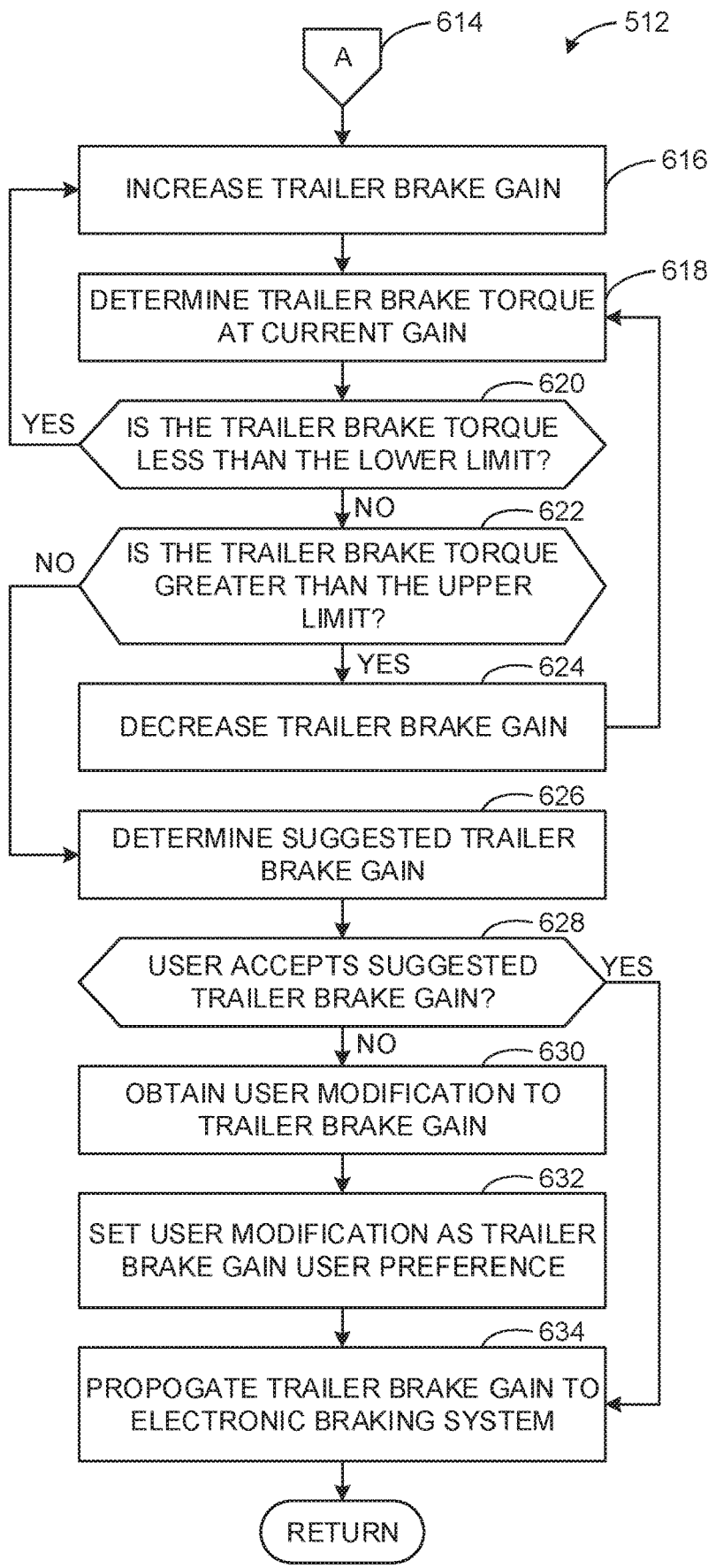

Flowcharts representative of example hardware logic, machine readable instructions, hardware implemented state machines, and/or any combination thereof for implementing the trailer brake gain calibration module 112 of FIG. 2 are shown in FIGS. 5-6B. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowcharts illustrated in FIGS. 5-6B, many other methods of implementing the example trailer brake gain calibration module 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-6B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example method 500 to calibrate a trailer brake gain with the trailer brake gain calibration module 112 is illustrated in FIG. 5 and begins at block 502. At block 502, the example data interface 210 receives vehicle status information from at least one of the example key cycle sensor 202, the example powertrain data collector 204, the example steering angle sensor 205, and the example electronic braking system 206 via the example component interface 208.

At block 504, the example gain calibration initializer 212 utilizes the vehicle status information received at block 502 to determine whether the status of the vehicle 102 and/or the trailer 104 coupled to the vehicle 102 has changed. In response to determining the status of at least one of the vehicle 102 and/or the trailer 104 has changed, processing proceeds to block 506. For example, if it is determined that the vehicle 102 was recently started based upon data from the key cycle sensor 202, processing proceeds to block 506. Alternatively, in response to determining the status of both the vehicle 102 and the trailer 104 has not changed, processing proceeds to block 510.

At block 506, the gain calibration initializer 212 determines if the trailer 104 is attached to the vehicle 102. In some examples, the gain calibration initializer 212 makes this determination based upon a notification received from the electronic braking system 206. In response to determining the trailer 104 is attached (e.g., coupled) to the vehicle 102, processing proceeds to block 508. Alternatively, in response to determining the trailer 104 is not attached to the vehicle 102, processing proceeds to block 510.

At block 508, the gain calibration initializer 212 determines whether the speed of the vehicle 102 and the steering angle of the vehicle 102 satisfy respective thresholds. For example, the gain calibration initializer 212 may determine that the speed of the vehicle 102 satisfies a threshold when the speed of the vehicle 102 is below a value (e.g., less than 20 miles per hour, less than 10 miles per hour, etc.) and that the steering angle of the vehicle 102 satisfies a threshold when the steering angle of the vehicle 102 is below a value (e.g., less than 5 degrees, less than 10 degrees, etc.). In response to determining the speed and steering angle of the vehicle 102 satisfy respective thresholds, processing proceeds to block 512. Conversely, in response to at least one of speed or steering angle of the vehicle 102 not satisfying respective thresholds, processing proceeds to block 510.

At block 510, the gain adjustment manager 220 determines the trailer brake gain is not to be adjusted and the trailer brake gain is to remain equal to a previously determined/calibrated trailer brake gain. Upon completion of block 510, processing returns to block 502.

At block 512, described in further detail in conjunction with FIGS. 6A-6B, in response to determining the status of the vehicle 102 has changed, the trailer 104 is attached to the vehicle 102, and the speed and steering angle of the vehicle 102 are within set thresholds, the trailer brake gain calibration module 112 determines a calibrated value of trailer brake gain.

At block 514, the gain calibration initializer 212 determines if it is desired to recalibrate the trailer brake gain. In response to determining it is desired to recalibrate the trailer brake gain, processing returns to block 502 of the example method 500 of FIG. 5. Alternatively, in response to determining that it is not desired to recalibrate the trailer brake gain, the example method 500 of FIG. 5 ends.

An example method that can be executed to implement the example trailer brake gain calibration module 112 by calibrating the trailer brake gain (FIG. 5, block 512) is illustrated in FIGS. 6A-6B. With reference to the preceding figures and associated descriptions, the example method 512 of FIGS. 6A-6B begins execution at block 602, at which the data interface 210 of FIG. 2 obtains (e.g., receives) a train mass from the powertrain data collector 204 via the component interface 208.

At block 604, the gain calibration initializer 212 of FIG. 2 calculates the maximum and minimum mass of the trailer 104 based upon the train mass (e.g., the mass of the vehicle 102 and the trailer 104 combined) and a maximum and minimum mass of the vehicle 102 (e.g., a gross vehicle weight (GVW) and curb weight, respectively) retrieved from the parameter storer 222. Thus, for example, the maximum mass ($M_{max}$) and minimum mass ($M_{min}$) of the trailer 104 are calculated in accordance with Equations (1) and (2) below:

$$M_{min} = \text{Train mass} - \text{GVW} \qquad \text{Equation (1)}$$

$$M_{max} = \text{Train mass} - \text{Curb weight} \qquad \text{Equation (2)}$$

At block 606, deceleration of the vehicle 102 for vehicle only braking is determined. In some examples, determining deceleration further includes the example deceleration lookup table 213 generating a lookup table of acceleration/deceleration of the vehicle 102 associated with corresponding vehicle only brake torque. In some examples, values of acceleration/deceleration of the vehicle 102 are obtained from the powertrain data collector 204 via the data interface 210 and brake torque values are obtained from the brake torque calculator 216. Additionally or alternatively, a value of acceleration (e.g., 0.2 g, 0.3 g, etc.) can be assumed (e.g., predetermined). In response to the completion of the lookup table, processing proceeds to at least one of block 608 and/or block 610. While processing proceeds to each of block 608 and block 610 substantially in parallel in the illustrated example, processing may be serial in other examples.

At block 608 and block 610, the gain calibration initializer 212 calculates a lower limit of trailer brake torque and an upper limit of trailer brake torque, respectively. In some examples, the lower limit calculated at block 608 is determined based on the minimum mass of the trailer calculated at block 604, an acceleration/deceleration of the train for the truck brake torque applied as stored in the deceleration lookup table 213, and a minimum radius of the trailer tires as obtained from the parameter storer 222. Similarly, the upper limit calculated at block 610 is determined based on the maximum mass of the trailer calculated at block 604, an acceleration/deceleration of the of the train for the truck brake torque applied as stored in the deceleration lookup table 213, and a maximum radius of the trailer tires as obtained from the parameter storer 222. Thus, for example, the lower limit ($TBT_{LL}$) and upper limit ($TBT_{UL}$) of trailer brake torque are calculated in accordance with Equations (3) and (4) below:

$$TBT_{LL} = M_{min} * \text{Acceleration} * \text{Radius}_{min} \qquad \text{Equation (3)}$$

$$TBT_{UL} = M_{max} * \text{Acceleration} * \text{Radius}_{max} \qquad \text{Equation (4)}$$

In response to calculation of each of the lower limit and the upper limit of trailer brake torque, processing proceeds to block 612.

At block 612, the gain calibration initializer 212 in conjunction with the brake signal applicator 214 sets the trailer brake gain to zero and applies a corresponding brake pressure (e.g., via a signal generated by the brake signal applicator 214) to the braking systems 107, 109 accordingly. This gives the technical effect of calculating a value for vehicle braking only. Upon completion of block 612, processing proceeds to block 616 via block 614.

At block 616, at least one of the gain calibration initializer 212 or the gain adjustment manager 220 in conjunction with the brake signal applicator 214 increases the trailer brake gain. For example, the trailer brake gain can be increased by a constant value (e.g., increase by 2, increase by 1, etc.). Additionally or alternatively, in examples where the previous trailer brake gain was 0, the gain calibration initializer can increase the trailer brake gain based on a determined maximum and minimum weight of the trailer 104 (e.g., increase by 2 for a small trailer, increase by 4 for a medium sized trailer, increase by 6 for a large trailer, etc.). In response to the increase of the trailer brake gain, the brake signal applicator 214 applies a pressure via a generated signal (e.g., a voltage signal, a current signal, a pressure signal, etc.) to at least the braking systems 107 and the braking systems 109 and processing proceeds to block 618.

At block 618, the brake torque calculator 216 calculates a trailer brake torque based upon a difference between the brake torque calculated when the trailer brake gain equals zero determined at block 612 and the current brake torque calculated at block 616. In response to the determination of the trailer brake torque, processing proceeds to block 620.

At block 620, the threshold comparator 218 compares the trailer brake torque calculated at block 618 to the lower limit trailer brake torque calculated at block 608. In response to the trailer brake torque satisfying the limit (e.g., the trailer brake torque is greater than the lower limit), processing proceeds to block 622. Conversely, in response to the trailer brake torque not satisfying the limit (e.g., the trailer brake torque is less than the lower limit), processing returns to block 616, wherein the trailer brake torque is increased.

At block 622, the threshold comparator 218 compares the trailer brake torque calculated at block 618 to the upper limit trailer brake torque calculated at block 608. In response to the trailer brake torque satisfying the limit (e.g., the trailer brake torque is less than the upper limit), processing proceeds to block 626. Conversely, in response to the trailer brake torque not satisfying the limit (e.g., the trailer brake torque is greater than the upper limit), processing proceeds to block 624.

At block 624, the gain adjustment manager 220 in conjunction with the brake signal applicator 214 decreases the trailer brake gain. For example, the trailer brake gain can be decreased by a constant value (e.g., decrease by 1, decrease by 2, etc.). Alternatively, in response to a previously selected trailer brake gain generating a trailer brake torque less than the trailer brake torque lower limit, the trailer brake gain can be decreased to an amount less than the current trailer brake gain and greater than the trailer brake gain that generated a trailer brake torque less than the limit. In response to the decrease of the trailer brake gain, the brake signal applicator 214 applies a pressure via a generated signal (e.g., a voltage signal, a current signal, a pressure signal, etc.) to at least the braking systems 107 and the braking systems 109 based upon the gain and processing proceeds to block 618.

At block 626, in response to the trailer brake torque being determined to satisfy the lower limit at block 622 and being determined to satisfy the upper limit at block 624, the gain adjustment manager 220 determines that the current trailer brake gain is the suggested (e.g., calibrated) trailer brake gain and processing proceeds to block 628.

At block 628, the gain adjustment manager 220 determines whether a user accepted or rejected the suggested trailer brake gain via an input to the display 114. In response to determining the user accepted the suggested trailer brake gain, processing proceeds to block 634. Conversely, in response to determining the user rejected the suggested trailer brake gain, processing proceeds to block 630.

At block 630, the gain adjustment manager 220 obtains a user input to modify the suggested trailer brake gain via inputs to the display 114. In some examples, the gain adjustment manager 220 can obtain an input to increase the suggested trailer brake gain and the gain adjustment manager 220 increases the trailer brake gain accordingly. Conversely, the gain adjustment manager 220 can obtain an input to decrease the suggested trailer brake gain and the gain adjustment manager 220 decreases the trailer brake gain accordingly.

At block 632, further in response to receiving the user input to modify the suggested trailer brake gain, the gain adjustment manager 220, in some examples, sets the modification as a preference for the user of the vehicle. For example, if the modification to the suggested trailer brake gain increased the trailer brake gain, the gain adjustment manager 220 can determine the user prefers a trailer brake gain larger than the suggested value (e.g., the braking of the trailer 104 provides a "tug" to the vehicle 102). In other examples, if the modification to the suggested trailer brake gain decreased the trailer brake gain, the gain adjustment manager 220 can determine the user prefers a trailer brake gain less than the suggested value (e.g., in some examples, resulting in a smoother application of trailer brakes).

At block 634, the gain adjustment manager 220 propagates the selected trailer brake gain to the electronic braking system 206 via the data interface 210 and the component interface 208. In response to completion of the propagation of the set trailer brake gain, the example method 512 of FIGS. 6A-6B ends and processing returns to block 514 of the example method 500 of FIG. 5.

Figure 7:
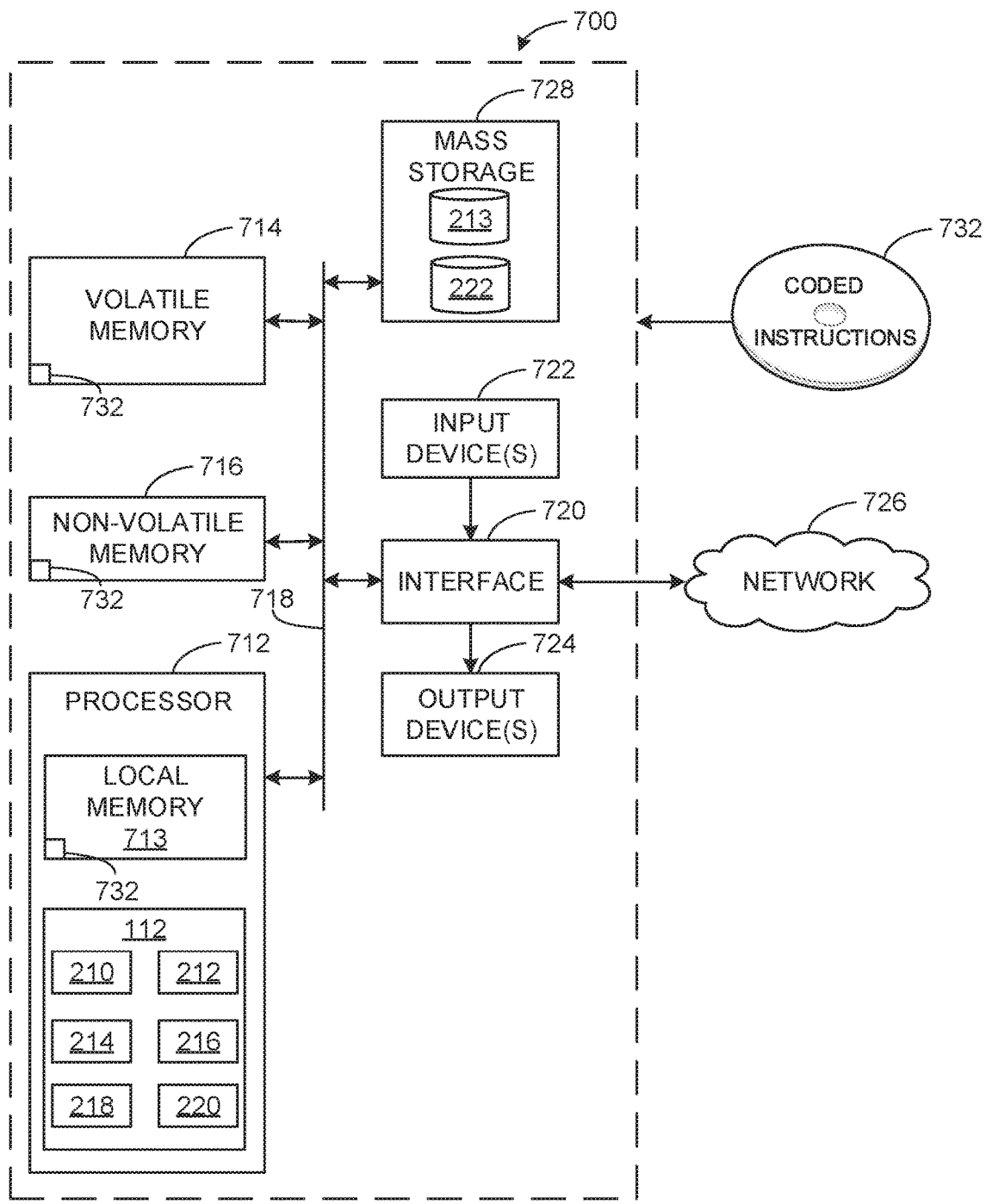
FIG. 7 is a block diagram of an example processing platform structured to execute machine readable instructions to implement the methods of FIGS. 5, 6A, and 6B and the example trailer brake gain calibration module of FIGS. 1 and 2.

FIG. 7 is a block diagram of an example processor platform 700 structured to execute the instructions of FIGS. 5-6B to implement the trailer brake gain calibration module 112 of FIGS. 1 and 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 210, the example gain calibration initializer 212, the example brake signal applicator 214, the example brake torque calculator 216, the example threshold comparator 218, and the example gain adjustment manager 220

The processor 712 of the illustrated example includes a local memory 713 (e.g., a cache). The processor 712 of the illustrated example is in communication with a main memory including a volatile memory 1014 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In the illustrated example of FIG. 7, the one or more mass storage devices 728 are further to implement the example deceleration lookup table 213 and the example parameter storer 222.

The machine executable instructions 732 of FIGS. 5-6B may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that automatically calibrate a trailer brake gain to be used to apply a pressure via a generated signal to brakes of a trailer. Automatically calibrating this value decreases the time a user of the vehicle must spend calibrating the trailer brake gain in addition to ensuring that the trailer brake gain value is consistently set to a proper value, decreasing wear on the trailer.

Example 1 includes an apparatus comprising a threshold comparator to compare a calculated trailer brake torque to at least a first or a second threshold, a gain adjustment manager to adjust a gain value based upon the calculated trailer brake torque satisfying at least one of the first or second thresholds, and a brake signal pressure applicator to generate a signal corresponding to a pressure to apply to a brake of a trailer based on the gain value.

Example 2 includes the apparatus of example 1, further including a gain calibration initializer to initialize adjustment of the gain value when gain adjustment is configured to be on, the trailer is detected to be coupled to a vehicle, and an ignition cycle of the vehicle is detected.

Example 3 includes the apparatus of example 1, wherein the first threshold is a lower limit defined by a minimum weight of the trailer and the second threshold is an upper limit defined by a maximum weight of the trailer, the lower limit and upper limit further defined by a deceleration of a vehicle and the trailer when brakes of the vehicle are applied.

Example 4 includes the apparatus of example 3, wherein the minimum weight of the trailer is based upon a maximum weight of the vehicle subtracted from a train mass received from a vehicle communication network, and the maximum weight of the trailer is based upon the minimum weight of the vehicle subtracted from the train mass.

Example 5 includes the apparatus of example 4, wherein an initial gain value is calculated based on the train mass.

Example 6 includes the apparatus of example 4, wherein the gain adjustment manager is further to increase the gain value when the calculated trailer brake torque is less than the first threshold, decrease the gain value when the calculated trailer brake torque is greater than the second threshold, and set the gain value as a calibrated gain value when the calculated trailer brake torque is greater than the first threshold and less than the second threshold.

Example 7 includes the apparatus of example 6, wherein the gain adjustment manager is further to receive a first user input from a display to at least one of reject or accept the calibrated gain value, propagate the calibrated gain value to the vehicle communication network when the user accepts the calibrated gain value, and modify the calibrated gain value per a second user input when the user rejects the calibrated gain value.

Example 8 includes an apparatus comprising a trailer brake gain calibration module programmed to compare a calculated trailer brake torque to at least one of a first or second threshold, adjust a gain value based upon satisfaction of at least one of the first or second threshold, and apply a pressure to a trailer brake based on the gain value.

Example 9 includes the apparatus of example 8, wherein the trailer brake gain calibration module is further programmed to initialize adjustment of the gain value when gain adjustment is configured to be on, the trailer is detected to be coupled to a vehicle, and an ignition cycle of the vehicle is detected.

Example 10 includes the apparatus of example 8, wherein the first threshold is a lower limit defined by a minimum weight of the trailer and the second threshold is an upper limit defined by a maximum weight of the trailer, the lower limit and upper limit further defined by a deceleration of a vehicle and the trailer when brakes of the vehicle are applied.

Example 11 includes the apparatus of example 10, wherein the minimum weight of the trailer is based upon a maximum weight of the vehicle subtracted from a train mass received from a vehicle communication network, and the maximum weight of the trailer is based upon the minimum weight of the vehicle subtracted from the train mass.

Example 12 includes the apparatus of example 11, wherein an initial gain value is calculated based on the train mass.

Example 13 includes the apparatus of example 11, wherein the trailer brake gain calibration module is further programmed to increase the gain value when the calculated trailer brake torque is less than the first threshold, decrease the gain value when the calculated trailer brake torque is greater than the second threshold, and set the gain value as a calibrated gain value when the calculated trailer brake torque is greater than the first threshold and less than the second threshold.

Example 14 includes the apparatus of example 13, wherein the trailer brake gain calibration module is further programmed to receive a first user input from a display to at least one of reject or accept the calibrated gain value, propagate the calibrated gain value to the vehicle communication network when the user accepts the calibrated gain value, and modify the calibrated gain value per a second user input when the user rejects the calibrated gain value.

Example 15 includes a method comprising comparing a calculated trailer brake torque to at least a first threshold or a second threshold, adjusting a gain value based upon the calculated trailer brake torque satisfying at least one of the first threshold or the second threshold, and applying a pressure to a brake of a trailer based on the gain value.

Example 16 includes the method of example 15, wherein the first threshold is a lower limit defined by a minimum weight of the trailer and the second threshold is an upper limit defined by a maximum weight of the trailer, the lower limit and upper limit further defined by a deceleration of a vehicle and the trailer when brakes of the vehicle are applied.

Example 17 includes the method of example 16, wherein the minimum weight of the trailer is based upon a maximum weight of the vehicle subtracted from a train mass received from a vehicle communication network, and the maximum weight of the trailer is based upon the minimum weight of the vehicle subtracted from the train mass.

Example 18 includes the method of example 17, wherein an initial gain value is calculated based on the train mass.

Example 19 includes the method of example 17, further including in response to determining the calculated trailer brake torque is less than the first threshold, increasing the gain value, in response to determining the calculated trailer brake torque is greater than the second threshold, decreasing the gain value, and in response to determining the calculated trailer brake torque is greater than the first threshold and less than the second threshold, setting the gain value as a calibrated gain value.

Example 20 includes the method of example 19, further including receiving a first user input from a display to at least one of reject or accept the calibrated gain value, in response to the user accepting the calibrated gain value, propagating the calibrated gain value to the vehicle communication network, and in response to the user rejecting the calibrated gain value, modifying the calibrated gain value per a second user input.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a threshold comparator to compare a calculated trailer brake torque to at least a first or a second threshold;
a gain adjustment manager to:
adjust a gain value based upon the calculated trailer brake torque satisfying at least one of the first or second thresholds;
increase the gain value when the calculated trailer brake torque is less than the first threshold;
decrease the gain value when the calculated trailer brake torque is greater than the second threshold; and
set the gain value as a calibrated gain value when the calculated trailer brake torque is greater than the first threshold and less than the second threshold; and
a brake signal applicator to generate a signal corresponding to a pressure to apply to a brake of a trailer based on the gain value.

2. The apparatus of claim 1, further including a gain calibration initializer to initialize adjustment of the gain value when:
gain adjustment is configured to be on;
the trailer is detected to be coupled to a vehicle; and
an ignition cycle of the vehicle is detected.

3. The apparatus of claim 1, wherein the first threshold is a lower limit defined by a minimum weight of the trailer and the second threshold is an upper limit defined by a maximum weight of the trailer, the lower limit and upper limit further defined by a deceleration of a vehicle and the trailer when brakes of the vehicle are applied.

4. The apparatus of claim 3, wherein:
the minimum weight of the trailer is based upon a maximum weight of the vehicle subtracted from a train mass received from a vehicle communication network; and
the maximum weight of the trailer is based upon the minimum weight of the vehicle subtracted from the train mass.

5. The apparatus of claim 4, wherein an initial gain value is calculated based on the train mass.

6. The apparatus of claim 1, wherein the gain adjustment manager is further to:
receive a first user input from a display to at least one of reject or accept the calibrated gain value;
propagate the calibrated gain value to a vehicle communication network when the first user input accepts the calibrated gain value; and
modify the calibrated gain value per a second user input when the first user input rejects the calibrated gain value.

7. An apparatus comprising:
a trailer brake gain calibration module programmed to:
compare a calculated trailer brake torque to at least one of a first or second threshold, adjust a gain value based upon satisfaction of at least one of the first or second threshold;
increase the gain value when the calculated trailer brake torque is less than the first threshold;
decrease the gain value when the calculated trailer brake torque is greater than the second threshold; and
set the gain value as a calibrated gain value when the calculated trailer brake torque is greater than the first threshold and less than the second threshold; and
apply a pressure to a brake of a trailer based on the gain value.

8. The apparatus of claim 7, wherein the trailer brake gain calibration module is further programmed to initialize adjustment of the gain value when:
gain adjustment is configured to be on;
the trailer is detected to be coupled to a vehicle; and
an ignition cycle of the vehicle is detected.

9. The apparatus of claim 7, wherein the first threshold is a lower limit defined by a minimum weight of the trailer and the second threshold is an upper limit defined by a maximum weight of the trailer, the lower limit and upper limit further defined by a deceleration of a vehicle and the trailer when brakes of the vehicle are applied.

10. The apparatus of claim 9, wherein:
the minimum weight of the trailer is based upon a maximum weight of the vehicle subtracted from a train mass received from a vehicle communication network; and
the maximum weight of the trailer is based upon the minimum weight of the vehicle subtracted from the train mass.

11. The apparatus of claim 10, wherein an initial gain value is calculated based on the train mass.

12. The apparatus of claim 7, wherein the trailer brake gain calibration module is further programmed to:
receive a first user input from a display to at least one of reject or accept the calibrated gain value;
propagate the calibrated gain value to a vehicle communication network when the first user input accepts the calibrated gain value; and
modify the calibrated gain value per a second user input when the first user input rejects the calibrated gain value.

13. A method comprising:
comparing a calculated trailer brake torque to at least a first threshold or a second threshold;
adjusting a gain value based upon the calculated trailer brake torque satisfying at least one of the first threshold or the second threshold;
in response to determining the calculated trailer brake torque is less than the first threshold, increasing the gain value;
in response to determining the calculated trailer brake torque is greater than the second threshold, decreasing the gain value; and
in response to determining the calculated trailer brake torque is greater than the first threshold and less than the second threshold, setting the gain value as a calibrated gain value; and
applying a pressure to a brake of a trailer based on the gain value.

14. The method of claim 13, wherein the first threshold is a lower limit defined by a minimum weight of the trailer and the second threshold is an upper limit defined by a maximum weight of the trailer, the lower limit and upper limit further defined by a deceleration of a vehicle and the trailer when brakes of the vehicle are applied.

15. The method of claim 14, wherein:
the minimum weight of the trailer is based upon a maximum weight of the vehicle subtracted from a train mass received from a vehicle communication network; and
the maximum weight of the trailer is based upon the minimum weight of the vehicle subtracted from the train mass.

16. The method of claim 15, wherein an initial gain value is calculated based on the train mass.

17. The method of claim 13, further including:
receiving a first user input from a display to at least one of reject or accept the calibrated gain value;
in response to the first user input accepting the calibrated gain value, propagating the calibrated gain value to a vehicle communication network; and
in response to the first user input rejecting the calibrated gain value, modifying the calibrated gain value per a second user input.

* * * * *